United States Patent [19]

Okada et al.

[11] Patent Number: 4,654,251

[45] Date of Patent: Mar. 31, 1987

[54] PRINTING MATERIAL SET FOR PREPARING BAR-CODE LABELS BY PRESSURE-SENSITIVE PRINTING METHOD

[75] Inventors: Yoshio Okada; Nobuo Ahiko; Yuriko Igarashi, all of Iwaki, Japan

[73] Assignee: Kureha Kagaku Kogyo Kabushiki Kaisha, Tokyo, Japan

[21] Appl. No.: 768,351

[22] Filed: Aug. 22, 1985

[30] Foreign Application Priority Data

Sep. 14, 1984 [JP] Japan ................................ 59-140312

[51] Int. Cl.[4] ........................... B32B 3/26; B32B 5/16; B32B 7/06

[52] U.S. Cl. .................................... 428/202; 156/240; 156/577; 427/147; 428/207; 428/220; 428/321.5; 428/323; 428/914

[58] Field of Search ..................... 428/201, 321.5, 914, 428/323, 207, 202; 156/230, 240, 584, 577; 101/288; 427/147

[56] References Cited

U.S. PATENT DOCUMENTS 3,043,732 7/1962 Shepherd, Jr. ...................... 156/230

3,767,211 10/1973 Amphlett ..................... 428/321.5 X 4,406,727 9/1983 Fujita ................................. 156/584

4,421,816 12/1983 Arnold ............................ 428/201 X 4,498,950 2/1985 Sato et al. ........................ 101/288 X 4,535,050 8/1985 Adair et al. ...................... 428/321.5

FOREIGN PATENT DOCUMENTS 487574 1/1976 Australia ............................. 101/288

*Primary Examiner*—Thomas J. Herbert
*Attorney, Agent, or Firm*—Oblon, Fisher, Spivak, McClelland & Maier

[57] ABSTRACT

Disclosed herein is a printing material set for preparing bar-code labels by pressure-sensitive printing method comprising (a) a printing tape of a film carrying on the inside surface thereof the microcapsules containing the minute particles of a pigment dispersed in a solution of an adhesive component dissolved in an organic solvent as a core material, and (b) a bar-code label tape comprising bar-code label papers having an adhesive on the undersurface thereof and a stripping tape carrying the bar-code label papers and being removably attached to the adhesive, the printing tape being superposed on the bar-code label tape, the microcapsules facing the uppersurface of the bar-code label tape.

27 Claims, 3 Drawing Figures

PRINTING MATERIAL SET FOR PREPARING BAR-CODE LABELS BY PRESSURE-SENSITIVE PRINTING METHOD

BACKGROUND OF THE INVENTION

The present invention relates to a printing material set for preparing bar-code labels by the pressure-sensitive printing method, by which the bar-code labels utilized in the statistical treatment of the data concerning the distribution of commodities such as the names, prices, weights, etc. of commodities are simply prepared and utilized.

The bar-code labels have hitherto been prepared by the transcription to sheets of ordinary paper while using an ink, and in addition to this method, a method has been devised by which printing is effected by using the simplified printers respectively fitted to the carbon paper, heat-sensitive paper or magnetic tape.

However, according to the above-mentioned printing system, for instance, in the method using an ink, the hands of the operator of the printer are apt to be stained in the case of exchanging the ink-roller, printed images are apt to be uneven and a special means are necessary for stabilizing the thus printed image against friction. In the method of using heat-sensitive paper, because of the co-existence of the colour-developer and the colour-coupler on the uppersurface of the label even after the printing, stains are apt to be caused by colouring due to post-heating of the material. In the case of using carbon paper, the transcribed pigment and wax have adhered onto the surface of the label and accordingly, the clearness of the image is deteriorated by heat and/or friction.

The above-mentioned defects are the cause of reducing the accuracy of reading the printed images, and such a reduction of the accuracy of reading has been experienced remarkably in the cases of printing the bar-codes on occasion and of attaching the printed labels onto the articles on occasion.

The object of the present invention is to provide a novel printing material set for preparing bar-code labels which has overcome the defects of the bar-code labels prepared by the conventional methods.

As a result of the present inventors' studying in order to solve the defects of the conventional bar-code labels, the present inventors have found that by using microcapsules containing minute particles of pigment dispersed in a solution of an adhesive component dissolved in an organic solvent, while without using a colour-developer, the reduction of the accuracy of reading the printed images of the bar-code label is improved, and the present invention has been attained on the basis of the above-mentioned finding.

BRIEF EXPLANATION OF DRAWINGS

This invention will be described with reference to FIGS. 1 to 3, in which.

SUMMARY OF THE INVENTION

Figure 1:
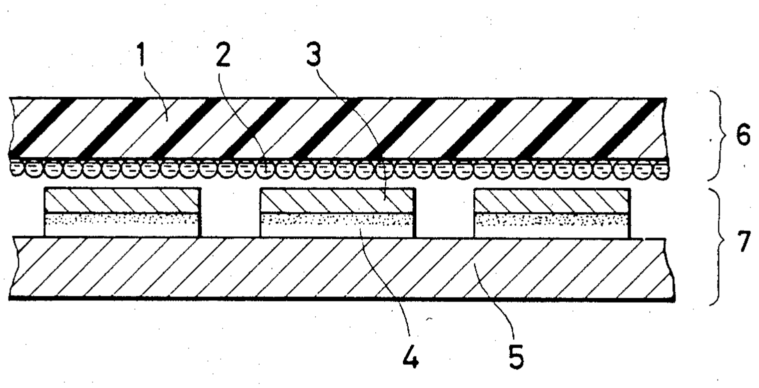
FIG. 1 and FIG. 3 are partial cross-section views of a printing material set of the present invention.

In a first aspect of the present invention, there is provided a printing material set by pressure-sensitive method, comprising a printing tape of a film carrying on the inside surface thereof microcapsules containing minute particles of a pigment dispersed in a solution of an adhesive component dissolved in an organic solvent as a core material, and a bar-code label tape comprising bar-code label papers having an adhesive on the undersurface thereof and a stripping tape carrying the bar-code label papers and being removably attached to the adhesive, the printing tape being superposed on the bar-code label tape.

In a second aspect of the present invention, there is provided a method for preparing a bar-code label, which comprises providing a printing material set comprising a printing tape of a film carrying on the inside surface thereof microcapsules containing minute particles of a pigment dispersed in a solution of an adhesive component dissolved in an organic solvent as a core material and a bar-code label tape comprising bar-code label papers having an adhesive on the undersurface thereof and a stripping tape carrying the bar-code label papers and being removably attached to the adhesive, the printing tape being superposed on the bar-code label tape, and impressing together the printing tape and the bar-code label papers such that those microcapsules which contact the bar-code label papers break.

DETAILED EXPLANATION OF THE INVENTION

The characteristic feature of the present invention lies in the printing material set for preparing the bar-code labels by the pressure-sensitive printing method, comprising (A) a printing tape of a film carrying on the inside surface thereof the microcapsules containing the minute particles of a pigment dispersed in a solution of an adhesive component dissolved in an organic solvent as a core material and (B) a bar-code label tape comprising the bar-code label papers having an adhesive on the undersurface thereof and a stripping tape carrying the bar-code label papers and being removably attached to the adhesive, the tape (A) being superposed on the tape (B).

In addition, the above-mentioned set for preparing the bar-code labels according to the present invention includes (i) those in which the pieces of the bar-code label papers have been adhered continuously at intervals of a definite distance to the stripping tape and (ii) those in which the bar-code label papers having perforations at equal intervals of a distance thereon is adhered removably and continuously to the stripping tape, for the both purposes of printing at any time and of attaching the pieces of the bar-code label papers at any time to the commodities.

The present invention will be explained more in detail while referring to the drawings which show the concrete construction of the printing material set according to the present invention as follows.

Figure 3:
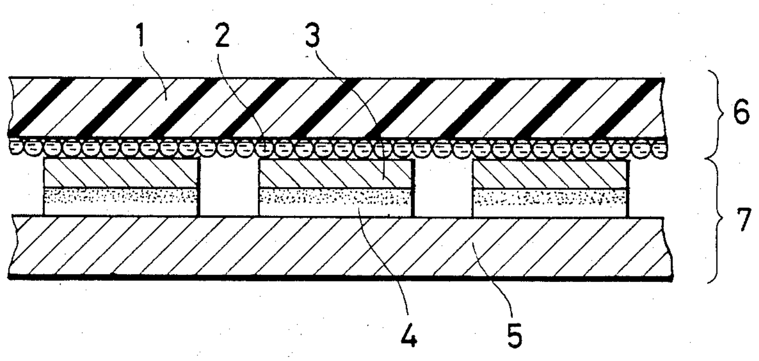

FIGS. 1 and 3 show the enlarged vertical section of the printing material set for preparing the bar-code labels according to the present invention, wherein a printing tape 6 comprises a film 1 and microcapsules 2 containing therein the minute particles of a pigment dispersed in a solution of an adhesive component dissolved in an organic solvent are carried on inside surface of the film 1, the bar-code label tape 7 comprises bar-code label papers 3 and a stripping tape 5, the bar-code label papers have the adhesive 4 on the undersurface thereof, the stripping tape 5 carries the bar-code label papers 3 and is adhered removably at predetermined intervals or with perforations to the adhesive 4, and the printing tape 6 is superposed on the bar-code label tape 7.

In the method of pressure-sensitive printing according to the present invention wherein the printing material set for preparing bar-code labels is used, for forming the bar-codes clearly on the bar-code label papers, it is necessary that the percussion pressure of the printer is large enough to uniformly break the microcapsules on the percussed part. For that purpose, the film carrying the microcapsules in the present invention is uniform in thickness of, for instance, less than 30 μm, preferably from 6 to 20 μm and it is preferable that the printing tape itself is not broken by the percussion pressure of the printer.

The microcapsules carried on the above-mentioned film can be produced by the method for producing the microcapsules for use in the conventional pressure-sensitive recording papers (European Patent Publication No. 0046415).

The size of the minute particles of a pigment contained within the above-mentioned microcapsules is preferably less than 50 nm, and it is particularly preferable that the size is less than 30 nm. In the case where the size is over 50 nm, the transfer of the minute particles of a pigment from the microcapsules is not effected favorably resulting in the insufficient density of the coloured image. In addition, the content of the minute particles of a pigment in the core material is preferably less than 25% by weight, preferably 5–20% by weight based on the core material of the microcapsule. In the case of over 25% by weight, the sufficient transfer of the minute particles of a pigment from the microcapsules is not effected.

As the minute particles of a pigment according to the present invention, the minute particles of a pigment having a deep colour is preferably used, and especially the minute particles of carbon is most preferably used.

The adhesive component which is contained within the microcapsules together with the minute particles of a pigment may be anything so far as it is soluble in an organic solvent and is able to retain the minute particles of a pigment transferred from the microcapsules after breaking thereof adhered onto the surface of the label and accordingly, is not specifically limited.

As the adhesive component effectively usable according to the present invention, polystyrene, polyacrylates, polymethacrylates, low-molecular polyethylene, ethylcellulose, natural rubber, chloroprene rubber and the like may be exemplified.

In addition, the weight ratio of the adhesive component necessary for adhering the minute particles of a pigment onto the surface of the label to the minute particles of a pigment is from 8:2 to 2:8.

The adhesive component is contained in the range of 1.5 to 30% by weight based on the core material.

A coloured dyestuff may be further contained in the microcapsules together with the pigment in cases of necessity, and as such a dyestuff, those of monoazo dyes, bisazo dyes, monoazo metal complex dyes, anthraquinone dyes, phthalocyanine dyes, triarylmethane dyes may be exemplified.

The coloured dyestuff in the core material is contained in the range of 0.15 to 10% by weight based on the core material.

As the organic solvent for dissolving the abovementioned adhesive component and dyestuff, for instance, alkylbenzenes such as toluene and xylene, diarylmethanes, diarylethanes, alkylbiphenyls, alkylnaphthalenes may be mentioned, and may be used after selecting suitably.

As the method for carrying the microcapsules containing the minute particles of a pigment dispersed in a solution of the adhesive component dissolved in an organic solvent onto the inside surface of the film, for instance, a process of coating the suspension of the microcapsules in a latex onto the inside surface of the film and drying thereof may be preferably adopted.

As the stripping tape which is used for laminating with the above-mentioned printing tape carrying the microcapsules containing the minute particles of a pigment dispersed in a solution of the adhesive component, any tape may be used so far as the bar-code label papers are attached removably to an adhesive and accordingly, it is not specifically limited.

Although "the bar-code label papers" according to the present invention includes all the sheets of paper used as the sheets of paper for recording, particularly, the coating paper, art paper, synthetic paper, etc. are preferably used for that purpose. In addition, the "stripping tape" may be any base material so far as it is easily detachable from the adhesive carried on the undersurface of the bar-code labels papers and accordingly, it does not necessarily mean a sheet of paper but also a sheet of plastic material.

In addition, the adhesive for use in the present invention is selected according to the material of the bar-code label papers, and the material of the stripping tape may be selected according to the kind of the adhesive.

In order to print bar-codes on the bar-code label papers 3 by using the superposed printing tape 6, the printing is carried out by impressing a predetermined figure of bar-codes on the upper surface of the printing tape 6 (namely, the film 1) with a percussion pressure obtained by using a bar-printer, a dot-printer, etc. The printing of the bar-codes on the surface of the bar-code label paper is accomplished simultaneously with the above impressing. As a result of rapid evaporation of the solvent dissolving the adhesive component and dye-stuff on the bar-code label paper, the printed bar-codes on the label is fixed in a stable state soon after the printing, not to be stained even by friction and to be maintained distinctly even after several months.

The characteristic feature of the performance of the printing material set for preparing bar-code labels according to the present invention lies in that the minute particles of a pigment dispersed in the solution of the adhesive component is released from the microcapsules which have been broken by the percussion pressure of printing, and rapidly adhere to the bar-code label papers, and after evaporation of the solvent, the minute particles of a pigment adheres to the papers firmly and is maintained in a stable state.

Accordingly, according to the present invention, the defects seen in the conventional printing material sets for preparing bar-code labels by the pressure-sensitive printing method such as staining, reduction of the clearness of the printed bar-code and stains due to friction are profitably improved.

EXAMPLE 1

1-1: Preparation of two prepolymers

After adjusting the pH of 162 g of aqueous 37% solution of formaldehyde (hereinafter referred to as formalin) by the addition of aqueous 2% solution of sodium hydroxide to 9.0, it was mixed with 63 g of melamine, and the mixture was brought into reaction while stirring the mixture at 70° C. Just after confirming the complete dissolution of melamine in the reaction mixture, 225 g of water were added to the reaction mixture, and the mixture was stirred for 3 min to obtain an aqueous solution of a prepolymer of melamine-formaldehyde resin (hereinafter referred to as M4F prepolymer, M4F meaning that the molar ratio of melamine to formaldehyde is 1:4 in the prepolymer).

Separately, after adjusting the pH of 146 g of formalin by the addition of triethanolamine to 8.5, it was mixed with 60 g of urea, and the mixture was brought into reaction for 1 hour at 70° C. to prepare an aqueous solution of a prepolymer of urea-formaldehyde resin (hereinafter referred to as U 1.8 F prepolymer.

1-2: Preparation of an oily dispersion

Into 670 g of diisopropylnaphthalene, 50 g of polystyrene (DICELASTYRENE ®, made by DAINIPPON INK Chem. Co., Ltd.) were dissolved, and in the obtained solution 85 g of carbon black (made by MITSUBISHI KASEI Co., Ltd., #33, size of 28 nm) was dispersed.

1-3: Microcapsulation

A mixture consisting of 100 g of M4F prepolymer (refer to 1-1), 50 g of U 1.8 F prepolymer (refer to 1—1), 10 g of the aqueous solution of the water-soluble cationic urea resin (Uramine ® P-1500, made by URAMINE Ind. Co., Ltd.), 210 g of water and 1 g of triethanolamine was adjusted to pH of 5.2 by the addition of aqueous 10% solution of citric acid, and by admixing the mixture with 3 g of aqueous 10% solution of NEOPELEX ® No. 6 (sodium dodecylbenzenesulfonate, made by KAO-ATLAS Co., Japan) a solution named as A-liquid was obtained.

Into the thus prepared A-liquid, 100 ml of the oily dispersion were dispersed so that the mean diameter of the oily dispersed particles is about 3–15 micrometers. The thus obtained aqueous dispersion was brought into reaction for 25 hours while gently stirring the aqueous dispersion and maintaining the aqueous dispersion at a temperature of 30° C., and after adding aqueous 10% solution of citric acid to the aqueous dispersion to adjust the pH of the dispersion to 3.0, the aqueous dispersion was continuously reacted under stirring to obtain a slurry of microcapsules encapsulating an oily dispersion of carbon black together with the adhesive.

EXAMPLE 2

2-1 Preparation of two prepolymers

After adjusting the pH of 162 g of formalin by the addition of aqueous 2% solution of sodium hydroxide to 9.0, it was mixed with 63 g of melamine, and the mixture was brought into reaction while stirring the mixture at 70° C. Just after confirming the complete dissolution of melamine in the reaction mixture, 225 g of water were added to the reaction mixture, and the mixture was stirred for 3 min to obtain an aqueous solution of a prepolymer of melamine-formaldehyde resin (M4F prepolymer).

Separately, after adjusting the pH of 146 g of formalin by the addition of triethanolamine to 8.5, it was mixed with 60 g of urea, and the mixture was brought into reaction for 1 hour at 70° C. to prepare an aqueous solution of a prepolymer of urea-formaldehyde resin (U 1.8 F prepolymer).

2-2: Preparation of an oily dispersion

Into 670 g of diisopropylnaphthalene, 1 g of an oil-soluble dyestuff (OIL BLUE BOS, made by Orient Chem. Co., Ltd.) and 50 g of polystyrene (DICELASTYRENE ®, made by DAINIPPON INK Chem. Co., Ltd.) were dissolved, and in the obtained solution 78 g of carbon black (made by MITSUBISHI KASEI Co., Ltd., #33, size of 28 nm) was dispersed.

2-3: Microcapsulation

A mixture consisting of 100 g of M4F prepolymer (refer to 2-1), 50 g of U 1.8 F prepolymer (refer to 2-1), 10 g of the aqueous solution of the water-soluble cationic urea resin (Uramine ® P-1500, made by URAMINE Ind. Co., Ltd.), 210 g of water and 1 g of triethanolamine was adjusted to pH of 5.2 by the addition of aqueous 10% solution of citric acid, and by admixing the mixture with 3 g of aqueous 10% solution of NEOPELEX ® No. 6 (sodium dodecylbenzenesulfonate, made by KAO-ATLAS Co., Japan) a solution named as A-liquid was obtained.

Into the thus prepared A-liquid, 100 ml of the oily dispersion (refer to 2-2) were dispersed so that the mean diameter of the oily dispersed particles is about 3–15 micrometers. The thus obtained aqueous dispersion was brought into reaction for 25 hours while gently stirring the aqueous dispersion and maintaining the aqueous dispersion at a temperature of 30° C., and after adding aqueous 10% solution of citric acid to the dispersion to adjust the pH of the dispersion to 3.0, the aqueous dispersion was continuously reacted under stirring to obtain a slurry of microcapsules encapsulating an oily dispersion of carbon black together with the adhesive and the coloured dyestuff.

EXAMPLE 3

Preparation of printing material set:

The microcapsules obtained in Examples 1 and 2 were suspended in latex of polyvinylidenechloride and then, the each suspension of the microcapsules was applied on the surface of a tape of a polyethylene film having 15μ in thickness.

The each coated polyethylene tape was superposed on the bar-code label tape comprising a bar-code label paper of a coated paper, an adhesive of natural rubber and a stripping tape of a paper coated with silicone resin.

Preparation of bar-code label

Figure 2:
FIG. 2 is a plane view of a bar-code label according to the present invention.

The each prepared printing material set as shown in FIG. 3 was printed by applying a percussion pressure and the printed images as shown in FIG. 2 were fixed on the surface of the bar-code label paper, respectively. The printed images were not stained by friction and were maintained distinctly even after one year, respectively.

What is claimed is:

1. A printing material set for preparing bar-code labels by pressure-sensitive method, comprising a printing tape consisting essentially of a film carrying on the inside surface thereof microcapsules containing minute particles of pigment dispersed in a solution of an adhesive component dissolved in an organic solvent as a core material, and a bar-code label tape comprising bar-code label papers having an adhesive on the undersurface thereof and a stripping tape carrying said bar-code label papers and being removably attached to said adhesive, said printing tape being superimposed on and contiguous to said bar-code label papers on said bar-code label tape.

2. The printing material set of claim 1, wherein the size of said minute particles of a pigment is less than 50 nm.

3. The printing material set of claim 1, wherein said minute particles of a pigment is minute particles of carbon.

4. The printing material set of claim 1, wherein the weight ratio of said adhesive component to said minute particles of a pigment in the core material is in the range of from 8:2 to 2:8.

5. The printing material set of claim 1, wherein the amount of said minute particles of a pigment is less than 25% by weight based on the core material.

6. The printing material set of claim 1, wherein said adhesive component in the core material is present in the range of 1.5 to 30% by weight based on the core material.

7. The printing material set of claim 1, wherein said adhesive component is polystyrene, polymethacrylate, polyacrylate, low-molecular weight polyethylene, ethylcellulose, natural rubber or chloroprene rubber.

8. The printing material set of claim 1, wherein said coloured dyestuff in the core material is present in the range of 0.15 to 10% based on the core material.

9. The printing material set of claim 1, wherein said organic solvent is selected from the group consisting of alkylbenzenes, diarylmethanes, diarylethanes, alkylbiphenyls and alkylnaphthalenes.

10. The printing material set of claim 1, wherein the core material of said microcapsules comprises said minute particles of a pigment dispersed in said solution of an adhesive dissolved in an organic solvent and further a coloured dyestuff soluble in the organic solvent.

11. The printing material set of claim 10, wherein said coloured dyestuff is selected from the group consisting of monoazo dyes, bisazo dyes, monoazo dyes of metal complex type, anthraquinone dyes, phthalocyanine dyes and triarylmethane dyes.

12. The printing material set of claim 1, wherein said film has a thickness of 6–20 μm.

13. The printing material set of claim 12, wherein said film is a plastic film.

14. A method for preparing a bar-code label, which comprises impressing together a printing tape and a bar-code label tape, wherein said printing tape consists essentially of a film carrying on the inside surface thereof microcapsules containing minute particles of a pigment dispersed in a solution of an adhesive component dissolved in an organic solvent as a core material and wherein said bar-code label tape comprises bar-code label papers having an adhesive on the undersurface thereof and a stripping tape carrying said bar-code label papers and being removably attached to said adhesive, said printing tape being superposed on and contiguous to said bar-code label papers on said bar-code label tape, such that those microcapsules which contact the bar-code label papers break.

15. A method of claim 14 which further comprises, after impressing together the printing tape and the bar-code label papers, removing the stripping tape from the adhesive on the undersurface of the bar-code label papers and attaching the bar-code label papers to an article.

16. The method of claim 14, wherein the size of said minute particles of a pigment is less than 50 nm.

17. The method of claim 14, wherein said minute particles of a pigment is minute particles of carbon.

18. The method of claim 14, wherein the weight ratio of said adhesive component to said minute particles of a pigment in the core material is in the range of from 8:2 to 2:8.

19. The method of claim 14, wherein said minute particles of a pigment in the core material is contained less than 25% by weight based on the core material.

20. The method of claim 14, wherein said adhesive component in the core material is contained in the range of 1.5 to 30% by weight based on the core material.

21. The method of claim 14, wherein said adhesive component is polystyrene, polymethacrylate, polyacrylate, low-molecular weight polyethylene, ethylcellulose, natural rubber or chloroprene rubber.

22. The method of claim 14, wherein the core material of said microcapsules comprises said minute particles of a pigment dispersed in said solution of an adhesive component dissolved in an organic solvent and further a coloured dyestuff soluble in the organic solvent.

23. The method of claim 14, wherein said coloured dyestuff is selected from the group consisting of monoazo dye, bisazo dye, monoazo dye of metal complex type, anthraquinone dye, phthalocyanine dye and triarylmethane dye.

24. The method of claim 14, wherein said coloured dyestuff in the core material is contained in the range of from 0.15 to 10% based on the core material.

25. The method of claim 14, wherein said organic solvent is selected from the group consisting of alkylbenzenes, diarylmethanes, diarylethanes, alkylbiphenyls and alkylnaphthalenes.

26. The method of claim 14, wherein said film has a thickness of 6–20 micrometers.

27. The method of claim 26, wherein said film is a plastic film.

* * * * *